United States Patent
Bartholdt et al.

(10) Patent No.: US 9,787,604 B2
(45) Date of Patent: Oct. 10, 2017

(54) CLOUD COMPUTING INFRASTRUCTURE, METHOD AND APPLICATION

(71) Applicants: Jörg Bartholdt, München (DE); Ludwig Andreas Mittermeier, München (DE)

(72) Inventors: Jörg Bartholdt, München (DE); Ludwig Andreas Mittermeier, München (DE)

(73) Assignee: Siemens Aktiengesellschaft, München (DE)

(*) Notice: Subject to any disclaimer, the term of this patent is extended or adjusted under 35 U.S.C. 154(b) by 150 days.

(21) Appl. No.: 14/412,687

(22) PCT Filed: Jun. 5, 2013

(86) PCT No.: PCT/EP2013/061575
§ 371 (c)(1),
(2) Date: Jan. 4, 2015

(87) PCT Pub. No.: WO2014/005782
PCT Pub. Date: Jan. 9, 2014

(65) Prior Publication Data
US 2015/0163166 A1   Jun. 11, 2015

(30) Foreign Application Priority Data
Jul. 4, 2012   (DE) .................. 10 2012 211 639

(51) Int. Cl.
*G06F 15/173* (2006.01)
*H04L 12/927* (2013.01)
(Continued)

(52) U.S. Cl.
CPC .......... *H04L 47/808* (2013.01); *G06F 9/5072* (2013.01); *H04L 67/10* (2013.01)

(58) Field of Classification Search
CPC ...... H04L 47/808; H04L 67/10; G06F 9/5072
See application file for complete search history.

(56) References Cited

U.S. PATENT DOCUMENTS 8,954,553 B1\* 2/2015 Colton ................. G06F 8/10
  709/223
9,210,173 B2\* 12/2015 Ferris ................. G06F 21/6218
(Continued)

OTHER PUBLICATIONS

PCT International Search Report and Written Opinion of the International Searching Authority dated Sep. 26, 2013 for corresponding PCT/EP2013/061575.

*Primary Examiner* — Krisna Lim
(74) *Attorney, Agent, or Firm* — Lempia Summerfield Katz LLC

(57) ABSTRACT

The present invention discloses a cloud computing infrastructure having a rights management device, which is designed to manage operating rights for at least one application which can be executed in the cloud computing infrastructure for the purpose of controlling the operation of the at least one application in the cloud computing infrastructure, to evaluate the managed operating rights with respect to execution of the at least one application and to output an execution enable on the basis of the evaluation of the operating rights, and having an execution device which is designed to execute the at least one application in the cloud computing infrastructure on the basis of the output execution enable. The present invention also discloses a method for operating at least one application in a cloud computing infrastructure and an application for execution in a cloud computing infrastructure.

15 Claims, 2 Drawing Sheets

(51) Int. Cl.
    *G06F 9/50*     (2006.01)
    *H04L 29/08*    (2006.01)

(56) References Cited

U.S. PATENT DOCUMENTS

| | | |
|---|---|---|
| 2007/0233837 A1 | 10/2007 | Imai |
| 2010/0223385 A1 | 9/2010 | Gulley et al. |
| 2010/0228819 A1 | 9/2010 | Wei |
| 2011/0231899 A1* | 9/2011 | Pulier ................. G06F 9/45558 726/1 |
| 2012/0151568 A1* | 6/2012 | Pieczul ............... H04L 63/0815 726/8 |
| 2013/0007845 A1* | 1/2013 | Chang .................... G06F 21/62 726/4 |
| 2013/0311986 A1* | 11/2013 | Arrouye .................... G06F 8/61 717/175 |
| 2013/0332588 A1* | 12/2013 | Maytal ................ G06F 11/3428 709/223 |
| 2014/0040438 A1* | 2/2014 | Donahue ................. G06F 9/455 709/220 |
| 2014/0040883 A1* | 2/2014 | Tompkins ............. G06F 9/5072 718/1 |
| 2015/0096053 A1* | 4/2015 | Negrea .................. G06F 21/10 726/28 |
| 2015/0215380 A1* | 7/2015 | Balacheff ................ H04L 67/10 709/203 |

* cited by examiner

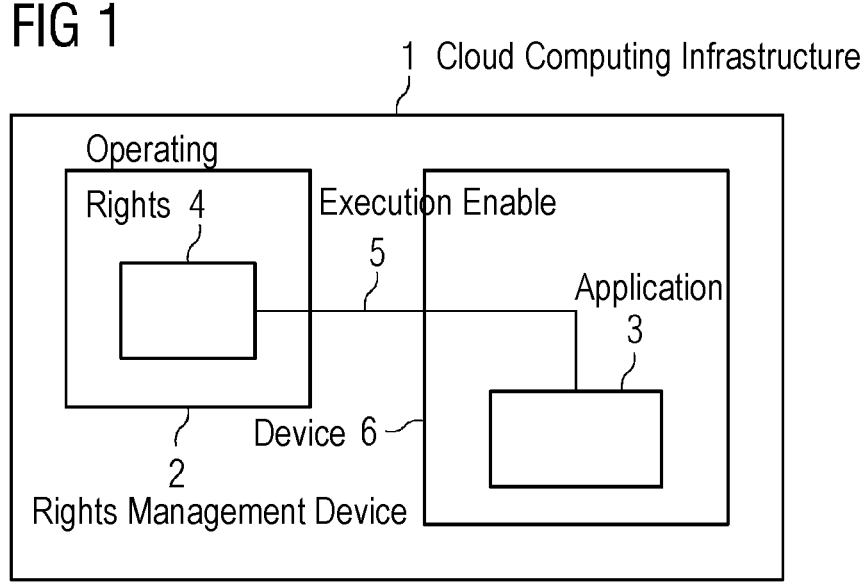
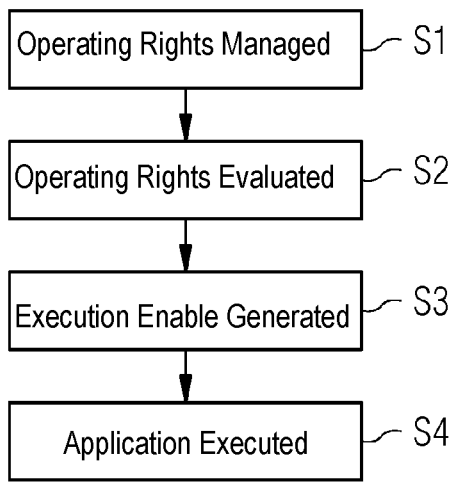

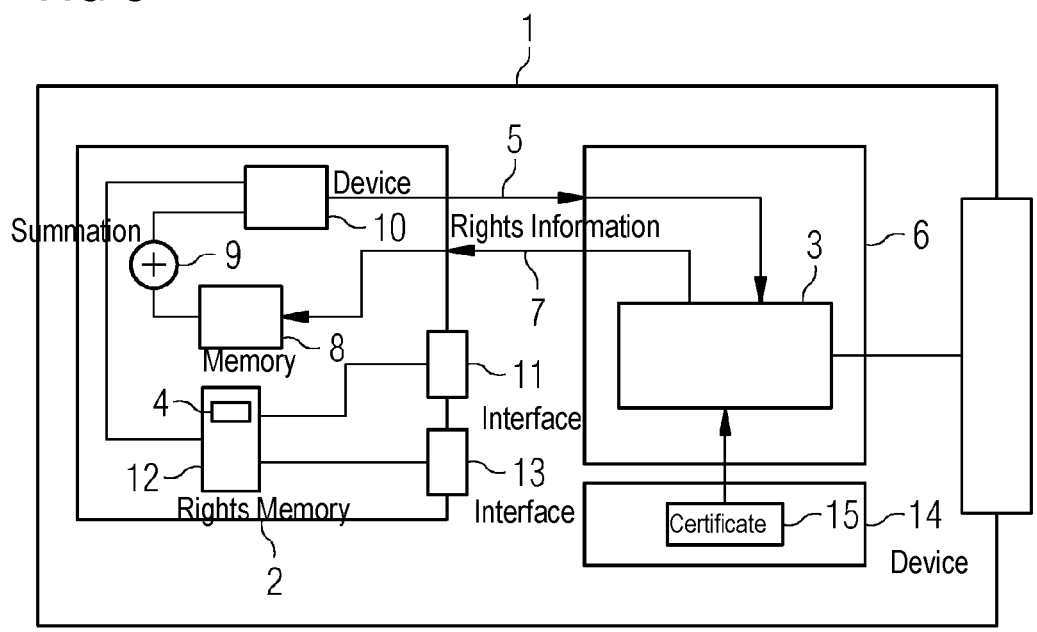

CLOUD COMPUTING INFRASTRUCTURE, METHOD AND APPLICATION

This application is the National Stage of International Application No. PCT/EP2013/061575, filed Jun. 5, 2013, which claims the benefit of DE 10 2012 211 639.7, filed Jul. 4, 2012. The entire contents of these documents are hereby incorporated herein by reference.

FIELD

The present embodiments relate to a cloud computing infrastructure, to a method for operating at least one application in a cloud computing infrastructure, and to an application for execution in a cloud computing infrastructure.

BACKGROUND

Modern computer applications are being operated more and more frequently in a cloud or cloud computing infrastructure. Reference is also made to cloud computing in this context.

Cloud computing may be an abstracted IT infrastructure in which the resources (e.g., computing capacity, data memory, network capacities) may be dynamically adapted to the resource requirement. This abstracted IT infrastructure may be accessed via a network.

In this case, an application is operated in a cloud using defined technical interfaces and protocols.

In the case of a cloud, the hardware is therefore not operated or provided by the user of an application. Rather, abstracted hardware is hired from one or more cloud providers as a service that may also be geographically remote, for example. The user's applications and data are then no longer on the local computer or in a corporate computing center but rather in the cloud.

The cloud may be accessed via a network (e.g., the Internet). A cloud may also be operated by a company, for example, as a private cloud in which the abstracted IT infrastructure may be reached via a network (e.g., an intranet, belonging to the company).

Since abstracted hardware is provided in a cloud, the number of resources (e.g., memory or computing power) of the abstracted hardware may be requested or additionally requested as required and within the scope of the existing actual infrastructure.

In this case, provision is not made to control the execution of an application in the cloud. For example, applications that may be enabled for operation only for a particular computer may be installed in a virtual system. After installation, this virtual system may be copied or "cloned" any desired number of times in a cloud.

SUMMARY AND DESCRIPTION

The scope of the present invention is defined solely by the appended claims and is not affected to any degree by the statements within this summary.

The present embodiments may obviate one or more of the drawbacks or limitations in the related art. For example, flexible controlling the operation of an application in a cloud computing infrastructure is provided.

A cloud computing infrastructure is provided. The cloud computing infrastructure includes a rights management device configured to manage operating rights for at least one application that may be executed in the cloud computing infrastructure for the purpose of controlling the operation of the at least one application in the cloud computing infrastructure, to evaluate the managed operating rights with respect to execution of the at least one application. The rights management device is also configured to output an execution enable based on the evaluation of the operating rights. The cloud computing infrastructure also includes an execution device configured to execute the at least one application in the cloud computing infrastructure based on the execution enable that has been output.

A method for operating at least one application in a cloud computing infrastructure is also provided. The method includeds managing operating rights of an application that may be executed in the cloud computing infrastructure, evaluating the managed operating rights, and generating an execution enable based on the evaluation of the operating rights. The method also includeds executing the at least one application in the cloud computing infrastructure based on the generated execution enable.

An application for execution in a cloud computing infrastructure is provided. The application includes or is included on a computer program product configured to allow execution of the application only when a digital certificate of the cloud computing infrastructure is valid. The computer program product may be a non-transitory computer-readable storage medium having instructions executable by the cloud computing infrastructure to allow the execution of the application.

Conventional cloud computing infrastructures may only inadequately monitor the execution of an application.

This knowledge is taken into account, and a possibility for controlling the execution of an application in a cloud computing infrastructure is provided in a detailed manner.

A rights management device that manages operating rights for a respective application is provided.

If the application is intended to be executed in the cloud computing infrastructure, the rights management device evaluates the operating rights in order to determine whether and under which conditions the application may be executed in the cloud computing infrastructure.

If this evaluation reveals that the respective application may be executed under the given conditions, the rights management device outputs an execution enable.

This execution enable is received by an execution device that executes or does not execute the respective application based on the execution enable.

As a result, the execution of applications may be controlled in a cloud computing infrastructure in detail, conditions under which execution of the respective application is intended to be possible may be stipulated in a cloud computing infrastructure.

In one embodiment, the execution device is configured to transmit an item of information relating to the resources consumed by the at least one application to the rights management device. This makes it possible to monitor the resources consumed by the respective application.

In one embodiment, the rights management device has a memory that is configured to store the information transmitted by the execution device. The rights management device also has a summation apparatus configured to use the stored transmitted information to calculate a sum of the resources consumed by the at least one application.

This makes it possible to log the set of resources consumed by the respective application and to store the log for further evaluation.

In one embodiment, the operating rights have at least rights information that indicates the maximum available resources for the at least one application inside the cloud computing infrastructure. The rights management device also has an evaluation device that is configured to output an execution enable that allows the at least one application to be executed, only when the calculated sum is less than the maximum available resources indicated by the operating rights for the at least one application. This makes it possible to specify in a very detailed manner how many resources may be consumed by an application and to accordingly control the execution of the application.

In one embodiment, the rights management device has an interface configured to couple the rights management device to a hardware dongle that has at least the operating rights for the at least one application. This makes it possible to use existing hardware dongles with the cloud computing infrastructure.

In one embodiment, the rights management device has a rights memory configured to store at least the operating rights for the at least one application. This makes it possible to easily manage the operating rights. For example, the operating rights may be stored in the form of a license file.

In one embodiment, the rights management device has a communication interface. The rights management device is configured to retrieve at least the operating rights for the at least one application from a server via the communication interface. This makes it possible to retrieve the operating rights from servers belonging to the manufacturer of the application or from other dedicated rights servers, for example.

In one embodiment, the cloud computing infrastructure has a certificate device configured to provide the at least one application with a digital certificate configured to confirm the functions of the rights management device and of the execution device to the application. As a result, the cloud computing infrastructure may be identified with respect to the application. Applications may therefore provide, for example, that the application are executed only in a cloud computing infrastructure that complies with the necessary standards for managing the operating rights.

In one embodiment, the cloud computing infrastructure has a computer infrastructure, the resources of which may be dynamically adapted to a resource requirement. Additionally or alternatively, the application is in the form of a computer program product and is configured to be executed in the cloud computing infrastructure and to provide users with a functionality predefined for the application.

In another embodiment, the cloud computing infrastructure does not have the rights management device, but rather the rights management device is configured to be part of the application.

The above refinements and developments may be combined with one another in any desired manner if useful. Further possible refinements, developments and implementations also include not explicitly mentioned combinations of features of the invention that are described above or are described below with respect to the exemplary embodiments. For example, a person skilled in the art will also add individual aspects as improvements or additions to the respective basic form of the present invention.

BRIEF DESCRIPTION OF THE DRAWINGS

FIG. 1 shows a block diagram of one embodiment of a cloud computing infrastructure 1;
FIG. 2 shows a flowchart of one embodiment of a method; and
FIG. 3 shows a further block diagram of one embodiment of a cloud computing infrastructure.

DETAILED DESCRIPTION

In all figures, same or functionally same elements and apparatuses have been provided with the same reference symbols unless stated otherwise.

A cloud computing infrastructure may be an infrastructure that includes a combination of hardware and software. A plurality of computer systems and data networks may form the hardware of the cloud computing infrastructure. The software that is executed on this hardware forms an abstracted or "virtual" operating environment in this case (e.g., a virtual PC), on which the respective application may be executed.

The operating rights for the at least one application provide information on which resources may be consumed by the respective application in the cloud. The rights information contained in the operating rights may provide information on how much processor power, main memory, data memory, network power or the like may be consumed by an application in the cloud computing infrastructure, for example.

The information transmitted by the execution device to the rights management device includes an item of information relating to how many resources are consumed by an application during operation. For example, this information may include the fact that an application uses 3 processor entities and/or occupies 16 GB of main memory and/or 2 TB of data memory in a database and/or 100 Mbit of transmission volume in a data network. Further information is possible depending on the embodiment.

A digital certificate may be a certificate that confirms that the function is provided by a cloud computing infrastructure. In other words, such a digital certificate may be checked by the respective application (e.g., by cryptographic methods). If the check is successful, the application may assume that the operating rights are checked by a rights management device. Such a digital certificate may be issued, for example, by an external certification body (e.g., the TÜV).

FIG. 1 shows a block diagram of one embodiment a cloud computing infrastructure 1.

The cloud computing infrastructure 1 in FIG. 1 has a rights management device 2 that is coupled to an execution device 6. The rights management device 2 also has operating rights 4 that are used to control the operation of the at least one application 3 in the cloud computing infrastructure 1. The rights management device 2 is configured to evaluate the managed operating rights 4 and to transmit an execution enable 5 to the execution device 6 based on the evaluation of the operating rights 4.

The execution device 6 then executes the at least one application 3 in the cloud computing infrastructure 1 based on the execution enable 5 that has been output.

In one embodiment, the cloud computing infrastructure 1 has a plurality of computer systems (e.g., server systems) that execute a computer program configured to provide the resources of the computer systems as resources of the cloud computing infrastructure 1. In further embodiments, the cloud computing infrastructure 1 may be the existing cloud computing infrastructure 1 of a provider of a cloud computing infrastructure 1 (e.g., Amazon EC2, or the like).

In one embodiment, the cloud computing infrastructure 1 may be operated in a company's intranet, for example, and may provide applications for the computers in the intranet. In such a case, rights management for the respective applications may also be carried out when there is no connection to a server belonging to the manufacturer of the application or to a license server that may be reached via the Internet, for example. In another embodiment, the cloud computing infrastructure 1 may be reachable via the Internet by all computers connected to the Internet.

In one embodiment, the rights management device 2 and the execution device 6 are in the form of computer program products that are executed on the computer systems that form the cloud computing infrastructure 1. In another embodiment, the rights management device 2 and the execution device 6 may also be in the form of hardware (e.g., processors), firmware, software or any desired combination thereof.

FIG. 2 shows a flowchart of a method according to one or more of the present embodiments.

In act S1, operating rights 4 of an application 3 that may be executed in the cloud computing infrastructure 1 are managed.

In act S2, the managed operating rights 4 are evaluated.

An execution enable 5 is then generated in act S3 based on the evaluation of the operating rights 4.

In act S4, the at least one application 3 is executed in the cloud computing infrastructure 1 based on the generated execution enable 5.

In further embodiments of the method, a number of further acts may be provided. The sequence of acts may vary in comparison with the embodiment described above.

One embodiment provides for an item of information 7 relating to the resources consumed by the at least one application 3 to be recorded. The recorded information 7 is used to calculate a sum of the resources consumed by the at least one application 3. In one embodiment, this sum is used to determine whether or not the respective application 3 has already consumed the resources enabled for this application 3.

In one embodiment, the operating rights 4 are retrieved from a server. This server may be, for example, the server belonging to a manufacturer of the application 3 storing the corresponding operating rights 4 for at least one customer on the server.

FIG. 3 shows a further block diagram of a cloud computing infrastructure 1 according to one or more of the present embodiments.

The cloud computing infrastructure 1 in FIG. 3 largely resembles the cloud computing infrastructure 1 from FIG. 1 but differs from the cloud computing infrastructure 1 from FIG. 1 to the effect that the rights management device 2 has a memory 8 configured to store the information 7 relating to the resources consumed by the respective application 3. The memory 8 is coupled to a summation apparatus 9 that uses the information 7 relating to the resources consumed by an application 3 to calculate a sum of the respectively consumed resources.

The rights management device 2 also has a rights memory 12 configured to store the operating rights 4 for the at least one application 3. The rights management device 2 also has an interface 11 and a communication interface 13 that are coupled to the rights memory 12. In this case, the interface 11 may be coupled to a hardware dongle that includes the operating rights 4. The communication interface 13 may be an Ethernet interface, for example, that may be used to retrieve operating rights 4 from a server.

The rights management device 2 has an evaluation device 10 that is coupled to the summation apparatus 9 and to the rights memory 12. In one embodiment, the evaluation device 10 compares the sum of the consumed resources with an item of rights information 7 that is contained in the operating rights 4 and provides information on how many resources may be consumed by the respective application 3 in the cloud computing infrastructure 1.

If the respective application 3 in the cloud computing infrastructure 1 has consumed fewer resources than indicated by the rights information contained in the operating rights 4, the evaluation device 10 outputs an execution enable 5 that indicates to the execution device 6 that the respective application 3 may be executed in the cloud computing infrastructure 1. In this case, the execution device 6 may query the execution enable 5 before starting an application 3 or else continuously or repeatedly during operation of an application 3.

The cloud computing infrastructure 1 also has a certificate device 14 that has a digital certificate 15 and provides the respective application 3 that is executed in the execution device 6 with the digital certificate 15. In this case, the digital certificate 15 has an item of information or confirmation relating to the fact that the cloud computing infrastructure 1 has the components according to one or more the present embodiments and therefore provides rights management. This makes it possible for a manufacturer of an application 3, for example, to provide a possibility for the respective application 3 to check only whether or not the cloud computing infrastructure 1 is certified. The application 3 may output an error message, for example, if the cloud computing infrastructure 1 is not certified. The manufacturer of the application 3 therefore need not provide any separate copy protection but checks whether the cloud computing infrastructure 1 in which the application is operated is certified.

In one embodiment, the memory 8 and the rights memory 12 are in the form of RAM memories of the cloud computing infrastructure 1. In further embodiments, the memory 8 and the rights memory 12 are in the form of hard disks or the like.

In one embodiment, the interface 11 is in the form of a USB interface. In further embodiments, the interface 11 is in the form of a serial interface, a parallel interface or any other desired digital interface.

In one embodiment, the communication interface 13 is in the form of an Ethernet interface and/or a WLAN interface and/or a digital bus or network interface.

In one embodiment, the components of the cloud computing infrastructure 1 (e.g., the rights management device 2, the execution device 6, the summation apparatus 9, the evaluation device 10, and the certificate device 14) are in the form of software components of the cloud computing infrastructure 1. In further embodiments, the components of the cloud computing infrastructure 1 are in the form of hardware (e.g., one or more processors), firmware, software or any desired combination thereof.

Although the present invention was described above using exemplary embodiments, the present invention is not restricted thereto. The present invention may be modified in various ways. For example, the invention may be changed or modified in a number of ways without departing from the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A cloud computing infrastructure comprising:
a rights management device configured to manage operating rights for at least one application that is executable in the cloud computing infrastructure for the purpose of controlling operation of the at least one application in the cloud computing infrastructure, to evaluate the managed operating rights with respect to execution of the at least one application, and to output an execution enable based on the evaluation of the operating rights; and
an execution device configured to execute the at least one application in the cloud computing infrastructure based on the execution enable that has been output.

2. The cloud computing infrastructure of claim 1, wherein the execution device is configured to transmit an item of information relating to resources consumed by the at least one application to the rights management device.

3. The cloud computing infrastructure of claim 2, wherein the rights management device comprises:
a memory configured to store the information transmitted by the execution device; and
a summation apparatus configured to use the stored transmitted information to calculate a sum of the resources consumed by the at least one application.

4. The cloud computing infrastructure of claim 3, wherein the operating rights comprise at least rights information that indicates maximum available resources for the at least one application inside the cloud computing infrastructure, and
wherein the rights management device comprises an evaluation device configured to output the execution enable, which allows the at least one application to be executed, only when the calculated sum is less than the maximum available resources indicated by the operating rights for the at least one application.

5. The cloud computing infrastructure of claim 1, wherein the rights management device comprises an interface configured to couple the rights management device to a hardware dongle that has at least the operating rights for the at least one application.

6. The cloud computing infrastructure of claim 1, wherein the rights management device comprises a rights memory configured to store at least the operating rights for the at least one application.

7. The cloud computing infrastructure of claim 1, wherein the rights management device comprises a communication interface, the rights management device being configured to retrieve at least the operating rights for the at least one application from a server via the communication interface.

8. The cloud computing infrastructure of claim 1, wherein the cloud computing infrastructure comprises a certificate device configured to provide the at least one application with a digital certificate configured to confirm functions of the rights management device and of the execution device to the application.

9. The cloud computing infrastructure of claim 1, wherein the cloud computing infrastructure comprises a computer infrastructure, resources of which are dynamically adaptable to a resource requirement, the application is in the form of a computer program product and is configured to be executed in the cloud computing infrastructure and to provide users with a functionality predefined for the application, or a combination thereof.

10. A method for operating at least one application in a cloud computing infrastructure, the method comprising:
managing operating rights of an application that is executable in the cloud computing infrastructure;
evaluating the managed operating rights;
generating an execution enable based on the evaluation of the managed operating rights; and
executing the at least one application in the cloud computing infrastructure based on the generated execution enable.

11. The method of claim 10, further comprising recording an item of information relating to the resources consumed by the at least one application; and
calculating a sum of the resources consumed by the at least one application using the recorded information.

12. The method of claim 11, wherein the operating rights comprise at least rights information that indicates maximum available resources for the at least one application inside the cloud computing infrastructure, and
wherein the method further comprises generating an execution enable that allows the at least one application to be executed only when the calculated sum is less than the maximum available resources indicated by the operating rights for the at least one application.

13. The method of claim 10, further comprising storing the operating rights on a hardware dongle that is coupleable to the cloud computing infrastructure, storing the operating rights in a rights memory of the cloud computing infrastructure, retrieving the operating rights from a server, or any combination thereof.

14. The method of claim 10, wherein the at least one application is provided with a digital certificate configured to confirm performance of the method to the application.

15. An application for execution in a cloud computing infrastructure comprising a rights management device configured to manage operating rights for at least one application that is executable in the cloud computing infrastructure for the purpose of controlling operation of the at least one application in the cloud computing infrastructure, to evaluate the managed operating rights with respect to execution of the at least one application, and to output an execution enable based on the evaluation of the operating rights, and an execution device configured to execute the at least one application in the cloud computing infrastructure based on the execution enable that has been output, the application comprising:
a computer program product configured to allow execution of the application only when a digital certificate of the cloud computing infrastructure is valid.

* * * * *